(12) United States Patent
Chae et al.

(10) Patent No.: US 12,542,548 B2
(45) Date of Patent: Feb. 3, 2026

(54) RECEIVER INCLUDING A PULSE AMPLITUDE MODULATION DECODER, AND A MEMORY DEVICE INCLUDING THE SAME

(71) Applicant: SAMSUNG ELECTRONICS CO., LTD., Suwon-si (KR)

(72) Inventors: Kwanyeob Chae, Seoul (KR); Chulwoo Kim, Seoul (KR); Yoonjae Choi, Seoul (KR); Kyeongkeun Kang, Seoul (KR)

(73) Assignees: SAMSUNG ELECTRONICS CO., LTD., Suwon-si (KR); Korea University Research And Business Foundation, Seoul (KR)

( * ) Notice: Subject to any disclaimer, the term of this patent is extended or adjusted under 35 U.S.C. 154(b) by 206 days.

(21) Appl. No.: 18/428,045

(22) Filed: Jan. 31, 2024

(65) Prior Publication Data
US 2024/0259007 A1    Aug. 1, 2024

(30) Foreign Application Priority Data

Feb. 1, 2023   (KR) .................. 10-2023-0013885
Mar. 30, 2023  (KR) .................. 10-2023-0042291

(51) Int. Cl.
*G11C 11/4076* (2006.01)
*H03K 3/037* (2006.01)
(Continued)

(52) U.S. Cl.
CPC ............ *H03K 7/02* (2013.01); *G11C 11/4076* (2013.01); *H03K 3/037* (2013.01); *H03K 19/20* (2013.01); *G06F 13/1668* (2013.01)

(58) Field of Classification Search
USPC ...................................... 365/233.1
See application file for complete search history.

(56) References Cited

U.S. PATENT DOCUMENTS 7,550,997 B2 *   6/2009  Gruijl ............... H03M 7/06
                                                326/60
7,626,442 B2    12/2009  Zerbe et al.
(Continued)

FOREIGN PATENT DOCUMENTS

JP     2021-150684 A2    9/2021
KR  10-2022-0036386 A    3/2022
(Continued)

OTHER PUBLICATIONS

Roshan-Zamir et al., "A Reconfigurable 16/32 Gb/s Dual-Mode NRZ/PAM4 SerDes in 65-nm CMOS", IEEE Journal of Solid-State Circuits (pp. 1-18), 2017.

*Primary Examiner* — Connie C Yoha
(74) *Attorney, Agent, or Firm* — Morgan, Lewis & Bockius LLP

(57) ABSTRACT

A 4-level pulse amplitude modulation (PAM-4) decoder including: a comparator configured to receive first input data, second input data, and a clock signal and output first comparison data and second comparison data, wherein the first comparison data and the second comparison data are comparison results for the first input data and the second input data; a clock delay circuit configured to delay the clock signal and generate a delayed clock signal; and a time-windowed least significant bit (LSB) decoder configured to receive the first comparison data, the second comparison data, and the delayed clock signal, wherein the time-windowed LSB decoder is configured to perform a decoding when the delayed clock signal is at a first level.

20 Claims, 13 Drawing Sheets

(51) Int. Cl.
*H03K 7/02* (2006.01)
*H03K 19/20* (2006.01)
*G06F 13/16* (2006.01)

(56) References Cited

U.S. PATENT DOCUMENTS

| | | |
|---|---|---|
| 9,246,598 B2 | 1/2016 | Asmanis et al. |
| 11,005,463 B2 | 5/2021 | Ichiyama |
| 11,398,934 B1 | 7/2022 | Casey et al. |
| 11,782,618 B2 | 10/2023 | Um et al. |
| 12,362,972 B2 * | 7/2025 | Lee ..................... H03M 7/165 |
| 2017/0257237 A1 | 9/2017 | Cirit et al. |
| 2022/0350512 A1 | 11/2022 | Spirkl et al. |

FOREIGN PATENT DOCUMENTS

| | | |
|---|---|---|
| KR | 10-2022-0071985 A | 6/2022 |
| KR | 10-2022-0077172 A | 6/2022 |

\* cited by examiner

FIG. 6

| Truth Table of Clock OR gate | | | |
|---|---|---|---|
| $COMP_n$ | $COMP_p$ | $CLK_{DEL}$ | $OR_{OUT}[n]$ |
| 0 | 0 | 0 | 0 |
| 0 | 1 | 0 | $OR_{OUT}[n-1]$ |
| 1 | 0 | 0 | $OR_{OUT}[n-1]$ |
| 1 | 1 | 0 | $OR_{OUT}[n-1]$ |
| 0 | 0 | 1 | 0 |
| 0 | 1 | 1 | 1 |
| 1 | 0 | 1 | 1 |
| 1 | 1 | 1 | 1 |

RECEIVER INCLUDING A PULSE AMPLITUDE MODULATION DECODER, AND A MEMORY DEVICE INCLUDING THE SAME

CROSS-REFERENCE TO RELATED APPLICATIONS

This application claims priority under 35 U.S.C. § 119 to Korean Patent Application Nos. 10-2023-0013885, filed on Feb. 1, 2023, and 10-2023-0042291, filed on Mar. 30, 2023, in the Korean Intellectual Property Office, the disclosures of which are incorporated by reference herein in their entireties.

TECHNICAL FIELD

The inventive concept relates to an electronic device, and more particularly, to a receiver including a pulse amplitude modulation decoder and a memory device including the receiver.

DISCUSSION OF RELATED ART

Mobile devices are increasingly accessible, and Internet connectivity is rapidly expanding. As a result, there is a growing demand for high-capacity and high-speed data transmission. However, signal modulation methods based on non-return to zero (NRZ)-type encoding, struggle to meet these high-capacity and high-speed data transmission needs. Recently, pulse amplitude modulation (PAM) methods are being actively researched as a solution to satisfy the requirements for high-capacity and high-speed data transmission. In addition, the use of receivers to decode data signals is gaining attention, as this approach enhances the reliability of the received data signals.

SUMMARY

The inventive concept provides a receiver that includes a pulse amplitude modulation decoder that uses a clock delay circuit instead of a reference voltage. The pulse amplitude modulation decoder compares levels of voltage input to a comparator, and utilizes a delay time of the comparator, thereby reducing power consumption and chip area size. In addition, the inventive concept provides a memory device including the receiver.

According to an embodiment of the inventive concept, there is provided a 4-level pulse amplitude modulation (PAM-4) decoder including: a comparator configured to receive first input data, second input data, and a clock signal and output first comparison data and second comparison data, wherein the first comparison data and the second comparison data are comparison results for the first input data and the second input data; a clock delay circuit configured to delay the clock signal and generate a delayed clock signal; and a time-windowed least significant bit (LSB) decoder configured to receive the first comparison data, the second comparison data, and the delayed clock signal, wherein the time-windowed LSB decoder is configured to perform a decoding when the delayed clock signal is at a first level.

According to an embodiment of the inventive concept, there is provided a receiver including an n-level pulse amplitude modulation (PAM-n) decoder, wherein the PAM-n decoder includes: a comparator receiving first input data, second input data, and a clock signal and outputting first comparison data and second comparison data, wherein the first comparison data and the second comparison data are comparison results for the first input data and the second input data; a clock delay circuit delaying the clock signal to generate a delayed clock signal; and a time-windowed least significant bit (LSB) decoder receiving the first comparison data, the second comparison data, and the delayed clock signal, wherein the time-windowed LSB decoder performs a decoding when the delayed clock signal is at a first level.

According to an embodiment of the inventive concept, there is provided a memory device including an interface configured to receive input data based on n-level pulse amplitude modulation (PAM-n), wherein the interface comprises a PAM-n decoder, and the PAM-n decoder includes: a comparator that receives first input data, second input data, and a clock signal and outputs first comparison data and second comparison data, wherein the first comparison data and the second comparison data are comparison results for the first input data and the second input data; a clock delay circuit that delays the clock signal to generate a delayed clock signal; and a time-windowed least significant bit (LSB) decoder that receives the first comparison data, the second comparison data, and the delayed clock signal, wherein the time-windowed LSB decoder that performs a decoding when the delayed clock signal is at a first level.

BRIEF DESCRIPTION OF THE DRAWINGS

Embodiments of the inventive concept will be more clearly understood from the following detailed description taken in conjunction with the accompanying drawings in which:

FIG. 6 is a diagram illustrating a truth table of a clock OR gate according to an embodiment;

DETAILED DESCRIPTION OF THE EMBODIMENTS

Hereinafter, embodiments of the inventive concept are described in detail with reference to the accompanying drawings.

Figure 1:
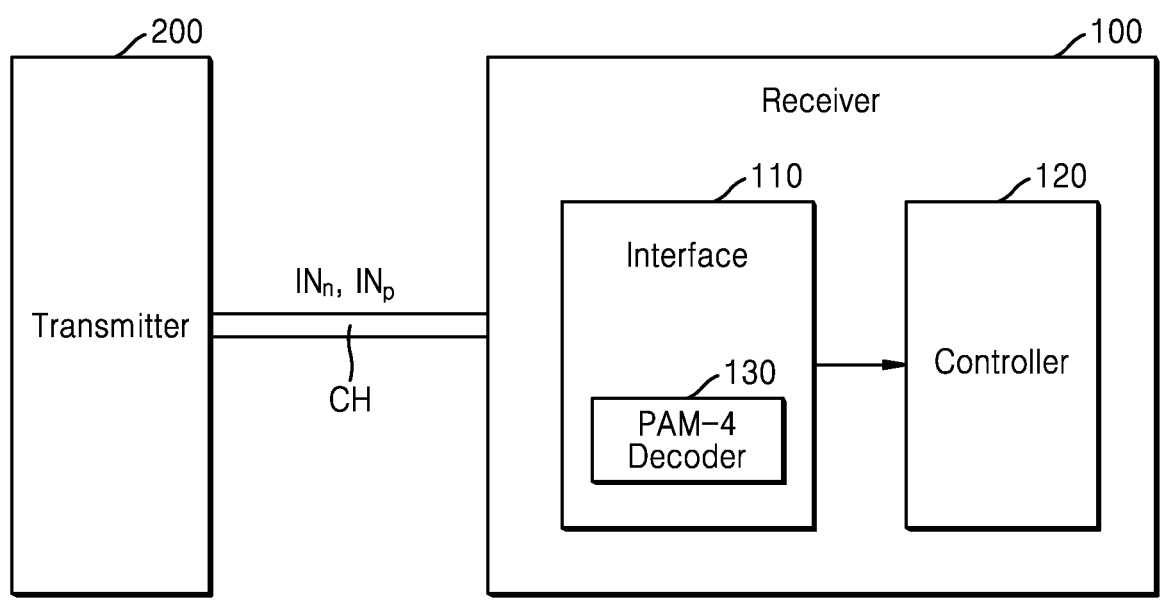
FIG. 1 is a block diagram schematically showing an electronic device according to an embodiment.

FIG. 1 is a block diagram schematically showing an electronic device 10 according to an embodiment.

Referring to FIG. 1, the electronic device 10 may include a transmitter 200 and a receiver 100. Hereinafter, for convenience of description, the transmitter 200 and the receiver 100 are described in terms of functions of transmitting and receiving input data $IN_n$ and $IN_p$, but the functions of the transmitter 200 and the receiver 100 are not limited thereto. The transmitter 200 and the receiver 100 may perform various operations including data processing on the input data $IN_n$ and $IN_p$.

Figure 2:
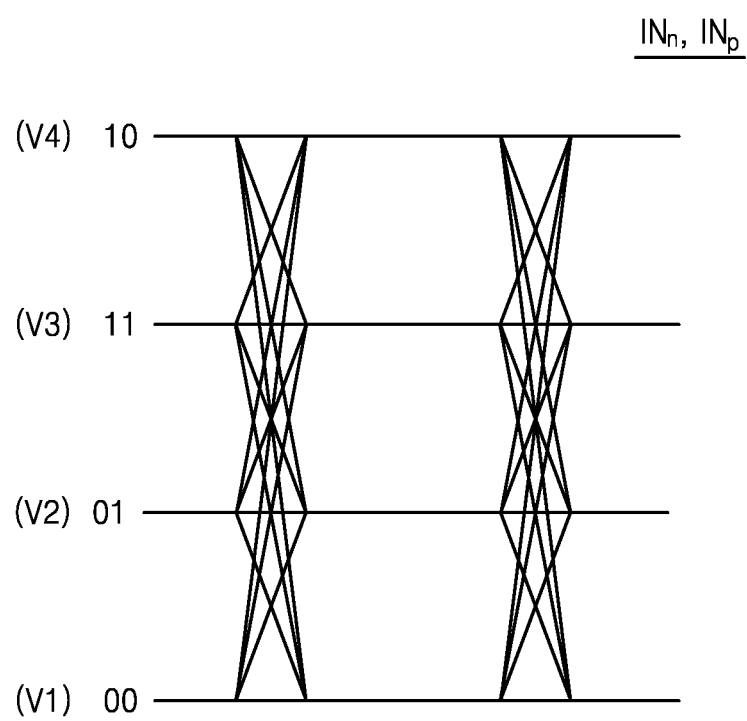
FIG. 2 is a diagram illustrating input data based on a 4-level pulse amplitude modulation (PAM-4) decoder according to an embodiment.

The transmitter 200 may transmit the input data $IN_n$ and $IN_p$ to the receiver 100 via a channel CH. The input data $IN_n$ and $IN_p$ includes n-bit symbols according to n-level pulse amplitude modulation (hereinafter, referred to as PAM-n) and may be expressed as $2^n$ data values. For example, as shown in FIG. 2, the transmitter 200 may generate and output the input data $IN_n$ and $IN_p$ that may represent four data values (00, 01, 10, 11) including 2-bit symbols according to PAM-4.

In some embodiments, the input data $IN_n$ and $IN_p$ in FIG. 1 may include first input data $IN_p$ and second input data $IN_n$. The first input data $IN_p$ and the second input data $IN_n$ may be provided as differential data and transmitted and received via differential channels between the transmitter 200 and the receiver 100. However, the inventive concept is not limited thereto. In some embodiments, the input data $IN_n$ and $IN_p$ may be provided as a single signal and transmitted and received via a single channel between the transmitter 200 and the receiver 100.

In addition, the receiver 100 receiving the first input data $IN_p$ and the second input data $IN_n$ according to PAM-4 shown in FIG. 1 is only an example, and the inventive concept is not limited thereto. For example, the inventive concept may be applied to a receiver 100 that receives data signals based on PAM-8, PAM-16, etc.

The receiver 100 may include an interface 110 and a controller 120. The interface 110 may include a PAM-4 decoder 130. The PAM-4 decoder 130 may receive the first input data $IN_p$ and the second input data $IN_n$ from the transmitter 200 and may decode the first input data $IN_p$ and the second input data $IN_n$ on the basis of PAM-4 to output a most significant bit (MSB) and a least significant bit (LSB). The first input data $IN_p$ and the second input data $IN_n$ may be data including an MSB and an LSB. The interface 110 may provide the generated MSB and LSB to the controller 120.

The PAM-4 decoder 130 according to an embodiment may perform decoding on the first input data $IN_p$ and the second input data $IN_n$ using a time-window method. For example, the PAM-4 decoder 130 may decode the first input data $IN_p$ and the second input data $IN_n$ at a rising edge of a clock signal and a falling edge of a delayed clock signal.

FIG. 2 is a diagram illustrating input data based on a PAM-4 decoder according to an embodiment.

FIG. 2 shows the input data $IN_n$ and $IN_p$ based on PAM-4 having four levels, but this is only an example, and the inventive concept is not limited thereto. For example, the inventive concept may be applied to input data $IN_n$ and $IN_p$ based on PAM-n having 8 or more levels.

Referring to FIG. 2, the lowest first level V1 of the input data $IN_n$ and $IN_p$ may be mapped to 2-bit data '00' and the highest fourth level V4 of the input data $IN_n$ and $IN_p$ may be mapped to 2-bit data '10'. The intermediate levels, e.g., the second level V2 and the third level V3, of the input data $IN_n$ and $IN_p$ may be mapped to 2-bit data '01 and 11,' respectively. The mapping of the first to fourth levels V1 to V4 and the input data $IN_n$ and $IN_p$ described above includes mapping according to a gray code method, but this is only an example. The mappings may be changed to suit various objectives.

In the descriptions related to PAM-4, the inventive concept focuses on the mapping relationship between the 2-bit data and the first to fourth levels V1 to V4 of the input data $IN_n$ and $IN_p$ shown in FIG. 2 for convenience of understanding. However, the inventive concept is not limited thereto.

Figure 3:
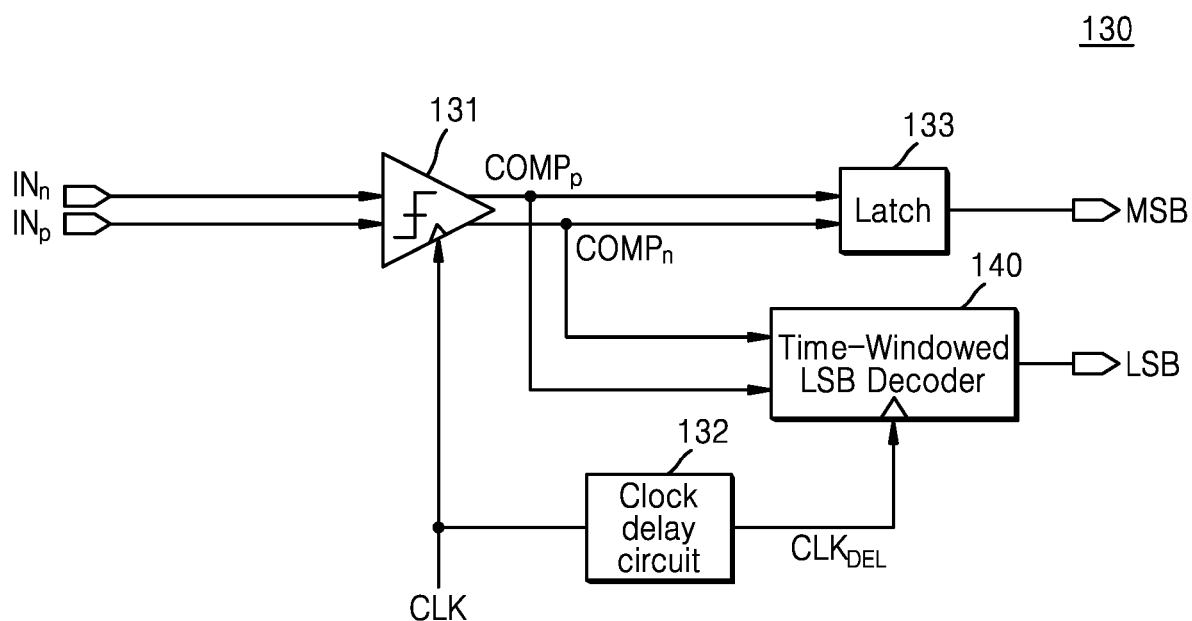
FIG. 3 is a block diagram illustrating the PAM-4 decoder according to an embodiment.

FIG. 3 is a block diagram illustrating the PAM-4 decoder 130 according to an embodiment.

FIG. 3 shows an embodiment of the PAM-4 decoder 130 that receives input data $IN_n$ and $IN_p$ based on PAM-4, but this is only an example. The inventive concept described below may also be applied to input data $IN_n$ and $IN_p$ based on PAM-n having a higher order. FIG. 2 may also be referred to for case of understanding FIG. 3.

Referring to FIG. 3, the PAM-4 decoder 130 may include a comparator 131, a clock delay circuit 132, a latch 133, and a time-windowed LSB decoder 140.

The comparator 131 may receive the first input data $IN_p$ and the second input data $IN_n$ from the outside. For example, the first input data $IN_p$ and the second input data $IN_n$ transmitted from the transmitter 200 may be received by an input buffer, and the comparator 131 may receive the first input data $IN_p$ and the second input data $IN_n$ from the input buffer. For example, the first input data $IN_p$ and the second input data $IN_n$ may include differential data. Each of the first input data $IN_p$ and the second input data $IN_n$ may include 2-bit data. The comparator 131 may receive a clock signal CLK from the outside. For example, the clock signal CLK may include a clock signal received from the transmitter 200. In another example, the clock signal CLK may include a clock signal that is generated in the receiver 100 through a clock data recovery technique. In another example, the clock signal CLK may include a clock signal that is generated in the receiver 100 through a phase lock loop. The comparator 131 may output comparison results for the first input data $IN_p$ and the second input data $IN_n$, which include differential data, according to the clock signal CLK. The comparator 131 may compare the first input data $IN_p$ and the second input data $IN_n$ according to the clock signal CLK and may output these data as first comparison data $COMP_p$ and second comparison data $COMP_n$, respectively. Each of the first comparison data $COMP_p$ and the second comparison data $COMP_n$ may include 1-bit data.

The clock delay circuit 132 may receive the clock signal CLK and output a delayed clock signal $CLK_{DEL}$. The configuration of the clock delay circuit 132 is described below with reference to FIG. 7.

The latch 133 may be electrically connected to the comparator 131 and may receive the first comparison data $COMP_p$ and the second comparison data $COMP_n$, which are output from the comparator 131. For example, the latch 133 may include a set-reset (SR) latch. The latch 133 may output an MSB on the basis of the first comparison data $COMP_p$ and the second comparison data $COMP_n$. The latch 133 may output the MSB by sampling the first comparison data $COMP_p$ and the second comparison data $COMP_n$.

The time-windowed LSB decoder 140 may be connected to the clock delay circuit 132 and may receive the delayed clock signal $CLK_{DEL}$. The time-windowed LSB decoder 140 may receive the first comparison data $COMP_p$ and the second comparison data $COMP_n$, which are output from the comparator 131. The time-windowed LSB decoder 140 may receive the first comparison data $COMP_p$, the second comparison data $COMP_n$, and the delayed clock signal $CLK_{DEL}$ and perform decoding based on the first comparison data COMP$_p$, the second comparison data COMP$_n$, and the delayed clock signal CLK$_{DEL}$ to output an LSB. The time-windowed LSB decoder 140 may output the LSB by decoding the first comparison data COMP$_p$, the second comparison data COMP$_n$, and the delayed clock signal CLK$_{DEL}$. The time-windowed LSB decoder 140 may perform decoding when the delayed clock signal CLK$_{DEL}$ is at a first level (e.g., a high level).

Figure 4:
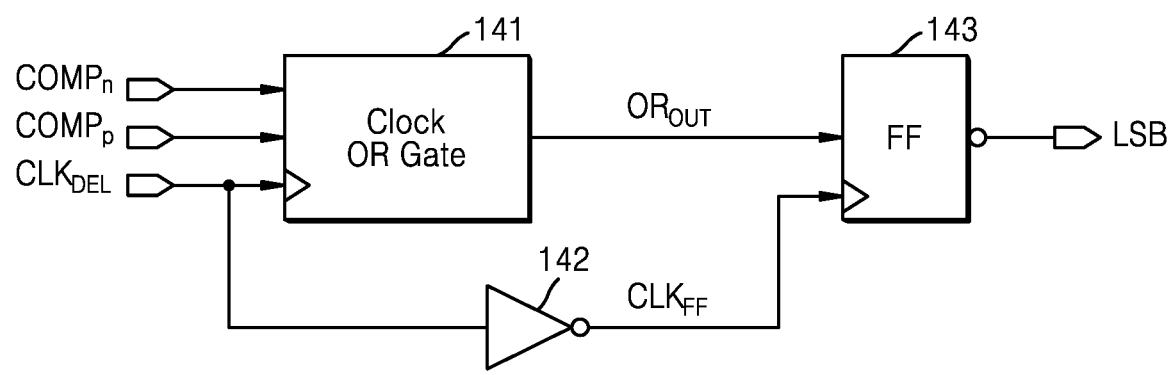
FIG. 4 is a block diagram illustrating a time-windowed least significant bit (LSB) decoder according to an embodiment.

FIG. 4 is a block diagram illustrating the time-windowed LSB decoder 140 according to an embodiment.

Referring to FIG. 4, the time-windowed LSB decoder 140 may include a clock OR gate 141, an inverter 142, and a flip-flop 143.

The clock OR gate 141 may receive the first comparison data COMP$_p$ and the second comparison data COMP$_n$ from the comparator 131 and may receive the delayed clock signal CLK$_{DEL}$ from the clock delay circuit 132. The clock OR gate 141 may decode the LSB according to the delayed clock signal CLK$_{DEL}$ and output the result as an output OR signal OR$_{OUT}$. For example, the clock OR gate 141 may operate on a rising edge of the clock signal CLK and a falling edge of the delayed clock signal CLK$_{DEL}$. In addition, the clock OR gate 141 may operate when the delayed clock signal CLK$_{DEL}$ is at a high level.

The inverter 142 may receive the delayed clock signal CLK$_{DEL}$, invert the delayed clock signal CLK$_{DEL}$, and output a flip-flop clock signal CLK$_{FF}$. The inverter 142 may be electrically connected between the clock OR gate 141 and the flip-flop 143 and generate the flip-flop clock signal CLK$_{FF}$. For example, the inverter 142 may be connected to an input of the clock OR gate 141.

The flip-flop 143 may receive the flip-flop clock signal CLK$_{FF}$ from the inverter 142 and the output OR signal OR$_{OUT}$ from the clock OR gate 141. The flip-flop 143 may sample the output OR signal OR$_{OUT}$, which includes return to zero (RZ)-type data, through the flip-flop clock signal CLK$_{FF}$, thereby restoring and re-timing the output OR signal OR$_{OUT}$ to non-return to zero (NRZ)-type LSB data. The flip-flop 143 may operate in synchronization with the flip-flop clock signal CLK$_{FF}$.

Figure 5:
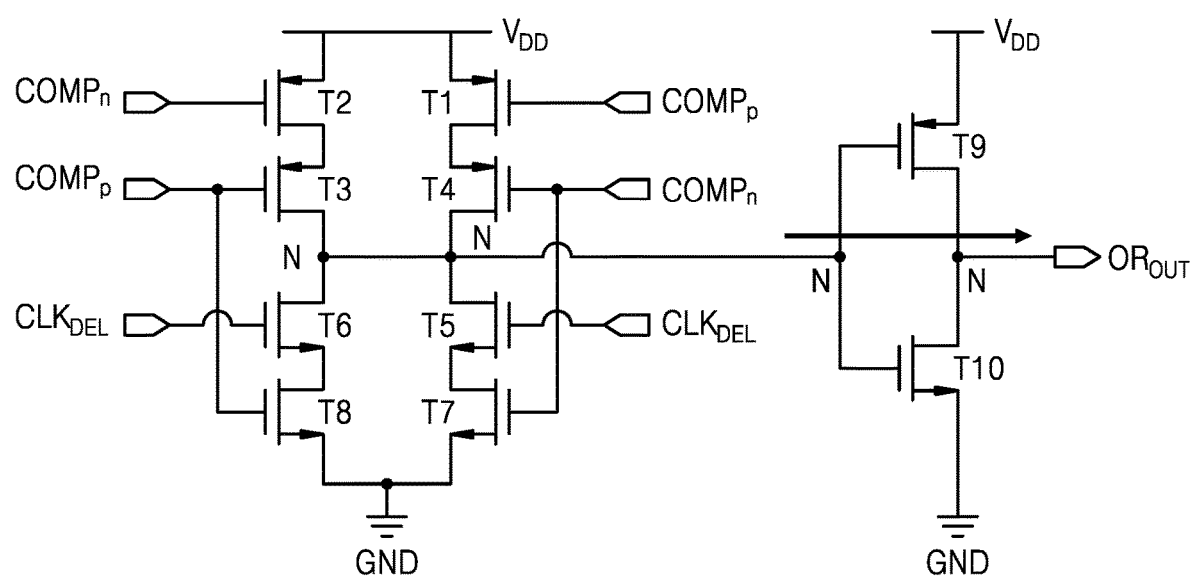
FIG. 5 is a block diagram illustrating a clock OR gate according to an embodiment.

FIG. 5 is a block diagram illustrating the clock OR gate 141 according to an embodiment.

Referring to FIG. 5, the clock OR gate 141 may include a plurality of transistors T1, T2, T3, T4, T5, T6, T7, T8, T9 and T10 (or referred to as first to tenth transistors T1 to T10). The clock OR gate 141 may include n-channel metal-oxide semiconductor (NMOS) and p-channel metal-oxide semiconductor (PMOS) transistors. An electrode of the first transistor T1 may receive a power supply voltage V$_{DD}$, and an electrode of the first transistor T1 may be connected to a fourth transistor T4. An electrode of the second transistor T2 may receive the power supply voltage V$_{DD}$, and an electrode of the second transistor T2 may be connected to a third transistor T3. An electrode of the third transistor T3 may be connected to the second transistor T2, and an electrode of the third transistor T3 may be connected to a first connection node N. An electrode of the fourth transistor T4 may be connected to the first transistor T1, and an electrode of the fourth transistor T4 may be connected to a second connection node N. An electrode of the fifth transistor T5 may be connected to the second connection node N, and an electrode of the fifth transistor T5 may be connected to a seventh transistor T7. An electrode of the sixth transistor T6 may be connected to the first connection node N, and an electrode of the sixth transistor T6 may be connected to an eighth transistor T8. An electrode of the seventh transistor T7 may be connected to the fifth transistor T5, and an electrode of the seventh transistor T7 may receive a ground voltage GND. An electrode of the eighth transistor T8 may be connected to the sixth transistor T6, and an electrode of the eighth transistor T8 may receive the ground voltage GND.

Gates of the first transistor T1 and the third transistor T3 may receive the first comparison data COMP$_p$. Gates of the second transistor T2 and the fourth transistor T4 may receive the second comparison data COMP$_n$. Gates of the fifth transistor T5 and the sixth transistor T6 may receive the delayed clock signal CLK$_{DEL}$. A gate of the seventh transistor T7 may receive the second comparison data COMP$_n$, and a gate of the eighth transistor T8 may receive the first comparison data COMP$_p$.

An electrode of the ninth transistor T9 may receive the power supply voltage V$_{DD}$, and an electrode of the ninth transistor T9 may be connected to a fourth connection node N. An electrode of the tenth transistor T10 may be connected to the fourth connection node N, and an electrode of the tenth transistor T10 may receive a ground voltage GND. Gates of the ninth transistor T9 and the tenth transistor T10 may receive the first comparison data COMP$_p$, the second comparison data COMP$_n$, and the delayed clock signal CLK$_{DEL}$ from a third connection node N that is connected to the second connection node N.

FIG. 6 is a diagram illustrating a truth table of a clock OR gate according to an embodiment.

Referring to FIG. 6, the clock OR gate may generate an output OR signal OR$_{OUT}$ on the basis of first comparison data COMP$_p$, second comparison data COMP$_n$, and a delayed clock signal CLK$_{DEL}$.

As shown in FIG. 6, if the delayed clock signal CLK$_{DEL}$ has a value of 0, when bit (logic) values of both the first comparison data COMP$_p$ and the second comparison data COMP$_n$ are 0, an output OR signal having a data bit value of '0' may be generated. When a bit value of the first comparison data COMP$_p$ is 1 and a bit value of the second comparison data COMP$_n$ is 0, an output OR signal having 'OR$_{OUT}$[n−1]' may be generated. A data bit value of OR$_{OUT}$[n−1] may be 0 or 1. Here, OR$_{OUT}$[n−1] may be a previous data bit value and OR$_{OUT}$[n] may be a current data bit value. When the bit value of the first comparison data COMP$_p$ is 0 and the bit value of the second comparison data COMP$_n$ is 1, the output OR signal having 'OR$_{OUT}$[n−1]' may also be generated. When the bit values of both the first comparison data COMP$_p$ and the second comparison data COMP$_n$ are 1, the output OR signal having 'OR$_{OUT}$[n−1]' may be generated.

Unlike the above, the case in which the delayed clock signal CLK$_{DEL}$ has a value of 1 is described below. When the bit values of both the first comparison data COMP$_p$ and the second comparison data COMP$_n$ are 0, the output OR signal having a data bit value of '0' may be generated. When the bit value of the first comparison data COMP$_p$ is 1 and the bit value of the second comparison data COMP$_n$ is 0, an output OR signal having a data bit value of '1' may be generated. When the bit value of the first comparison data COMP$_p$ is 0 and the bit value of the second comparison data COMP$_n$ is 1, the output OR signal having a data bit value of '1' may also be generated. When the bit values of both the first comparison data COMP$_p$ and the second comparison data COMP$_n$ are 1, the output OR signal having a data bit value of '1' may also be generated. For example, when the delayed clock signal CLK$_{DEL}$ has a value of 1, the clock OR gate may operate and the output OR signal having a value of '1' may be generated.

Figure 7:
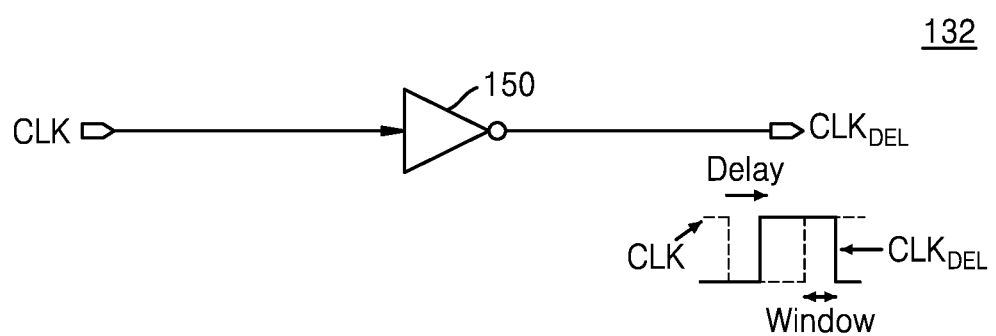
FIG. 7 is a block diagram illustrating a clock delay circuit according to an embodiment.

FIG. 7 is a block diagram illustrating the clock delay circuit 132 according to an embodiment.

Referring to FIG. 7, the clock delay circuit 132 may include an inverter 150. The inverter 150 may receive the clock signal CLK and output the delayed clock signal $CLK_{DEL}$. The clock delay circuit 132 may generate the delayed clock signal $CLK_{DEL}$ by inverting and delaying the clock signal CLK. The clock delay circuit 132 may adjust a delay time if necessary.

Figure 8:
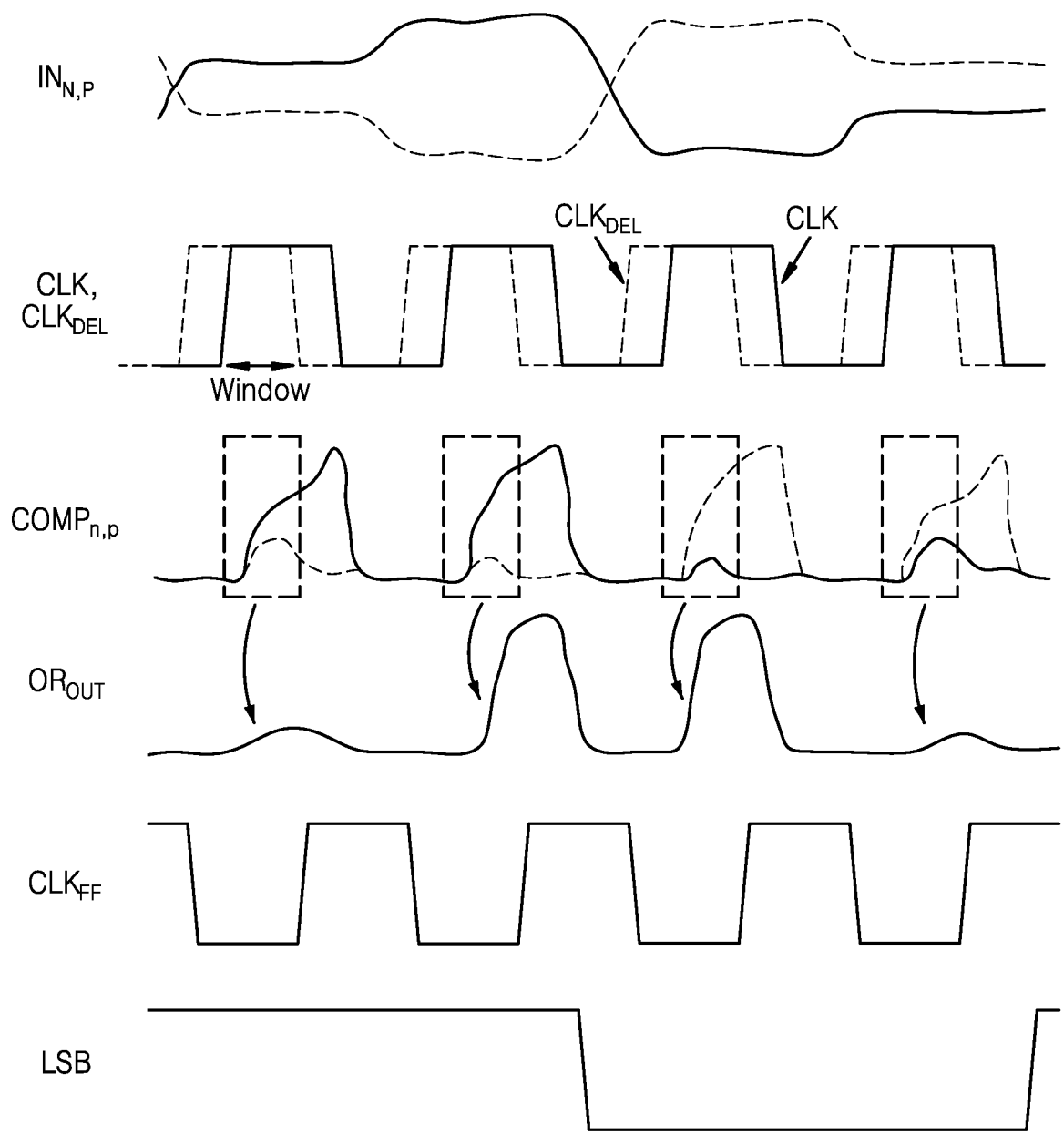
FIG. 8 is a timing diagram for explaining an operation of signals according to an embodiment.

FIG. 8 is a timing diagram for explaining an operation of signals according to an embodiment.

Referring to FIGS. 8 and 2 together, the PAM-4 decoder may receive the first input data $IN_p$ and the second input data $IN_n$. Each of the first input data $IN_p$ and the second input data $IN_n$ may include the 2-bit data. The case in which the first input data $IN_p$ and the second input data $IN_n$ are input as (11, 01), (10, 00), (00, 10), and (01, 11) is described below. For example, (11, 01) may indicate that the MSB of the first input data $IN_p$ is 1 and the LSB of the first input data $IN_p$ is 1. Here, the second input data $IN_n$ may have the MSB of 0 and the LSB of 1, as differential data of the first input data $IN_p$.

A time-window may correspond to a period from a rising edge of the clock signal CLK to a falling edge of the delayed clock signal $CLK_{DEL}$. For example, the time-windowed LSB decoder 140 of FIG. 3 may perform decoding based on the first comparison data $COMP_p$ and the second comparison data $COMP_n$, in a time-window section from the rising edge of the clock signal CLK to the falling edge of the delayed clock signal $CLK_{DEL}$.

When the input data is input as (11, 01), the output OR signal $OR_{OUT}$ may remain at approximately a low level in the time-window section. The LSB may remain at 1.

When the input data is input as (10, 00), the output OR signal $OR_{OUT}$ may transition from a low level to a high level in the time-window section. The LSB may remain at 0.

When the input data is input as (00, 10), the output OR signal $OR_{OUT}$ may transition from a low level to a high level in the time-window section. The LSB may remain at 0.

When the input data is input as (01, 11), the output OR signal $OR_{OUT}$ may remain at approximately a low level in the time-window section. The LSB may remain at 1.

As described above, when the LSB of the first input data $IN_p$ is 0, the output OR signal $OR_{OUT}$ may transition to a high level and the decoded LSB may remain at 0.

Figure 9:
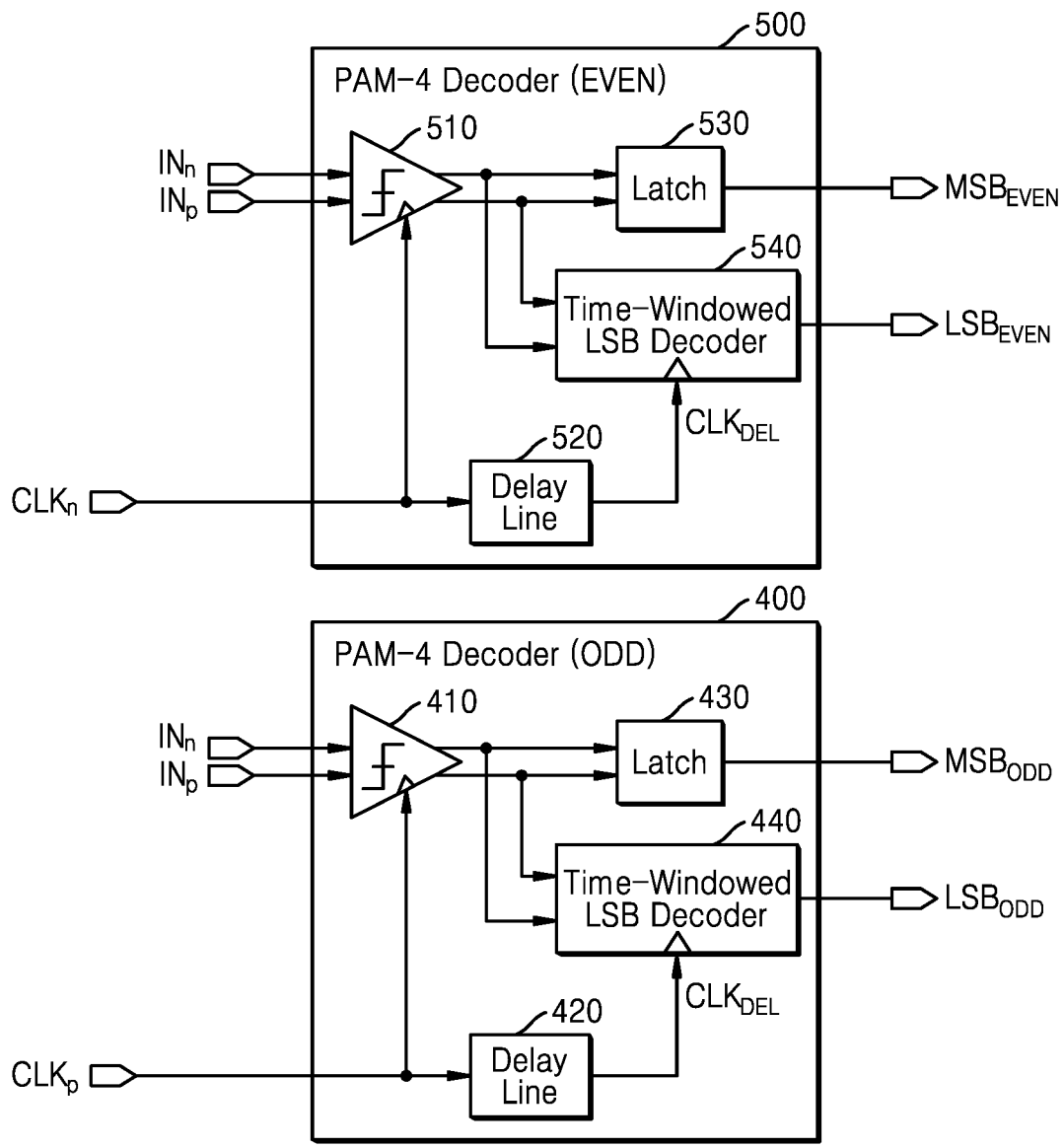
FIG. 9 is a diagram illustrating a PAM-4 decoder according to an embodiment.

FIG. 9 is a diagram illustrating a receiver 300 according to an embodiment.

Referring to FIG. 9, the receiver 300 may include a first PAM-4 decoder 400 and a second PAM-4 decoder 500. Repeated descriptions corresponding to those of FIG. 3 are omitted.

The first PAM-4 decoder 400 may include a first comparator 410, a first clock delay circuit (Delay line) 420, a first latch 430, and a first time-windowed LSB decoder 440. The second PAM-4 decoder 500 may include a second comparator 510, a second clock delay circuit (Delay line) 520, a second latch 530, and a second time-windowed LSB decoder 540.

The first comparator 410 may receive first input data $IN_p$ and second input data $IN_n$ from the outside. For example, the first comparator 410 may receive the first input data $IN_p$ and the second input data $IN_n$ transmitted from a transmitter, e.g., the transmitter 200 of FIG. 1. The first input data $IN_p$ and the second input data $IN_n$ may include differential data, and each of the first input data $IN_p$ and the second input data $IN_n$ may include 2-bit data. The first comparator 410 may receive a first clock signal $CLK_p$ from the outside.

The first clock delay circuit 420 may receive the first clock signal $CLK_p$ and output a delayed clock signal $CLK_{DEL}$. The delayed clock signal $CLK_{DEL}$ may be provided to the first time-windowed LSB decoder 440.

The first latch 430 may be connected to the first comparator 410 and receive first comparison data $COMP_p$ and second comparison data $COMP_n$, which are output from the first comparator 410. For example, the first latch 430 may include an SR latch. The first latch 430 may output an $MSB_{ODD}$ on the basis of the first comparison data $COMP_p$ and the second comparison data $COMP_n$.

The first time-windowed LSB decoder 440 may be connected to the first clock delay circuit 420 and receive the delayed clock signal $CLK_{DEL}$. The first time-windowed LSB decoder 440 may receive the first comparison data $COMP_p$ and the second comparison data $COMP_n$, which are output from the first comparator 410. The first time-windowed LSB decoder 440 may receive the first comparison data $COMP_p$, the second comparison data $COMP_n$, and the delayed clock signal $CLK_{DEL}$ and may output an $LSB_{ODD}$.

The second comparator 510 may receive first input data $IN_p$ and second input data $IN_n$ from the outside. For example, the second comparator 510 may receive the first input data $IN_p$ and the second input data $IN_n$ transmitted from a transmitter, e.g., the transmitter 200 of FIG. 1. The first input data $IN_p$ and the second input data $IN_n$ may include differential data, and each of the first input data $IN_p$ and the second input data $IN_n$ may include 2-bit data. The second comparator 510 may receive a second clock signal $CLK_n$ from the outside.

The second clock delay circuit 520 may receive the second clock signal $CLK_n$ and output a delayed clock signal $CLK_{DEL}$. The delayed clock signal $CLK_{DEL}$ may be provided to the second time-windowed LSB decoder 540.

The second latch 530 may be connected to the second comparator 510 and receive first comparison data $COMP_p$ and second comparison data $COMP_n$, which are output from the second comparator 510. For example, the second latch 530 may include an SR latch. The second latch 530 may output an $MSB_{EVEN}$ on the basis of the first comparison data $COMP_p$ and the second comparison data $COMP_n$.

The second time-windowed LSB decoder 540 may be connected to the second clock delay circuit 520 and receive the delayed clock signal $CLK_{DEL}$. The second time-windowed LSB decoder 540 may receive the first comparison data $COMP_p$ and the second comparison data $COMP_n$, which are output from the second comparator 510. The second time-windowed LSB decoder 540 may receive the first comparison data $COMP_p$, the second comparison data $COMP_n$, and the delayed clock signal $CLK_{DEL}$, and may output an $LSB_{EVEN}$.

Figure 10:
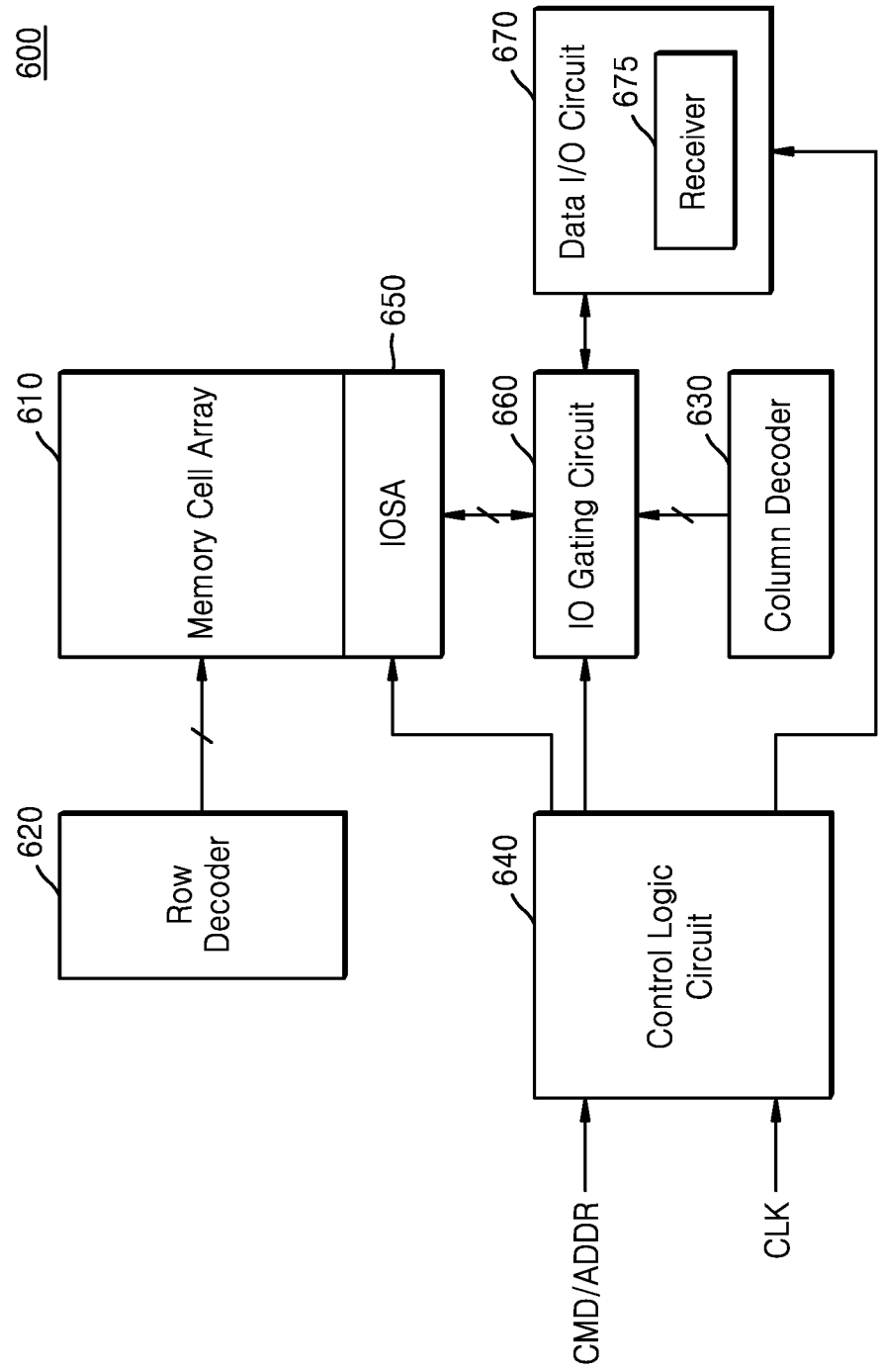
FIG. 10 is a block diagram illustrating a memory device according to an embodiment.

FIG. 10 is a block diagram illustrating a memory device 600 according to an embodiment. FIG. 10 shows an embodiment in which the memory device 600 is provided as a dynamic random access memory (DRAM) device.

Referring to FIG. 10, the memory device 600 may include a memory cell array 610, a row decoder 620, a column decoder 630, a control logic circuit 640, an input/output sense amplifier (IOSA) 650, an input/output gating circuit 660, and a data input/output circuit 670.

The memory cell array 610 may include memory cells connected to a plurality of word lines and a plurality of bit lines. The row decoder 620 may perform a selection operation on the word lines in response to a row address provided from the outside. In addition, the column decoder 630 may perform a selection operation on the bit lines in response to a column address provided from the outside.

The control logic circuit 640 may control the overall operation inside the memory device 600. For example, various circuit blocks inside the memory device 600 may be controlled in response to commands from a memory controller of the control logic circuit 640.

The control logic circuit 640 may sequentially receive a command CMD and an address signal ADDR via command/address pads (or pins). The control logic circuit 640 may decode the received command CMD, generate an internal command for controlling a memory operation, and provide the internal command to the input/output sense amplifier 650 and the input/output gating circuit 660. The control logic circuit 640 may further receive a clock signal CLK.

The data input/output circuit 670 according to the present embodiment may include a receiver 675 to which the above-described embodiments are applied. The receiver 675 may be configured according to the embodiments described above.

Figure 11:
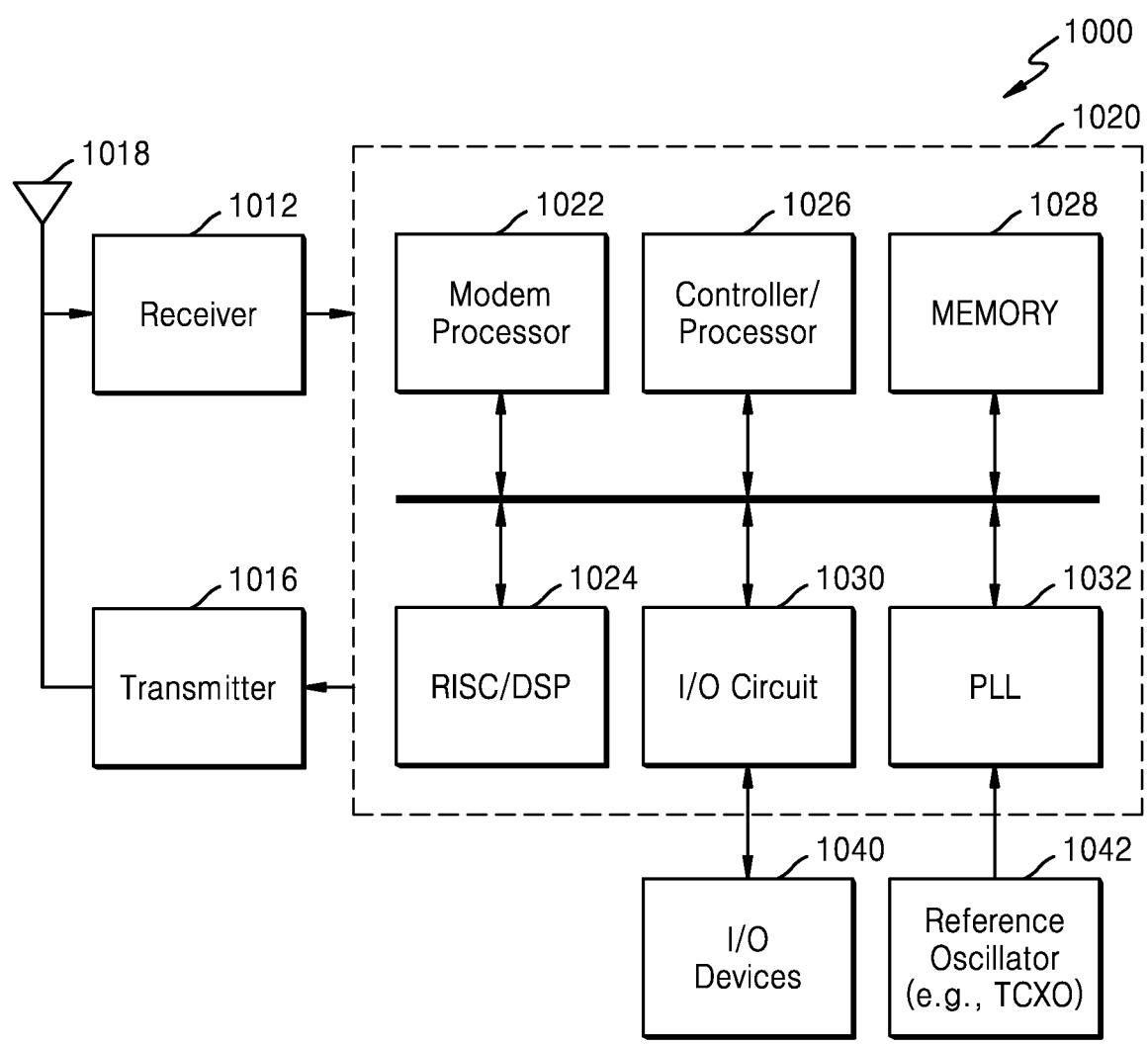
FIG. 11 is a block diagram illustrating a communication device according to an embodiment.

FIG. 11 is a block diagram illustrating a communication device 1000 according to an embodiment.

Referring to FIG. 11, the communication device 1000 may include a receiver 1012, a transmitter 1016, a communication module 1020, an antenna 1018, external input/output devices 1040, and a reference oscillator 1042. The receiver 1012 may include the PAM-4 decoder that performs a decoding operation according to the embodiments described in FIGS. 1 to 10. The receiver 1012 may decode input data received from the outside via the antenna 1018 and provide an MSB and an LSB to the communication module 1020. The transmitter 1016 may encode the MSB and LSB received from the communication module 1020 and output the encoded MSB and LSB to the outside via the antenna 1018.

The communication module 1020 may include a modem processor 1022, a reduced instruction set computer/digital signal processor (RISC/DSP) 1024, a controller/processor 1026, memory 1028, an input/output circuit 1030, and a phase lock loop 1032.

The modem processor 1022 may perform processing operations, such as encoding, modulation, demodulation, and decoding for data transmission and data reception. The RISC/DSP 1024 may perform general or specialized processing operations in the communication device 1000. The controller/processor 1026 may control blocks inside the communication module 1020. The memory 1028 may store data and various pieces of command code. The input/output circuit 1030 may communicate with the input/output devices 1040. The input/output circuit 1030 may include the PAM-4 decoder according to the embodiments described with respect to FIGS. 1 to 10. The input/output circuit 1030 may decode input data received from the input/output devices 1040 and output the MSB and LSB. The phase lock loop 1032 may perform a frequency modulation operation using a frequency signal received from the reference oscillator 1042. The reference oscillator 1042 may be provided as a crystal oscillator (XO), a voltage controlled crystal oscillator (VCXO), or a temperature compensated crystal oscillator (TCXO). The communication module 1020 may perform processing operations required for communication using an output signal generated in the phase lock loop 1032.

Figure 12:
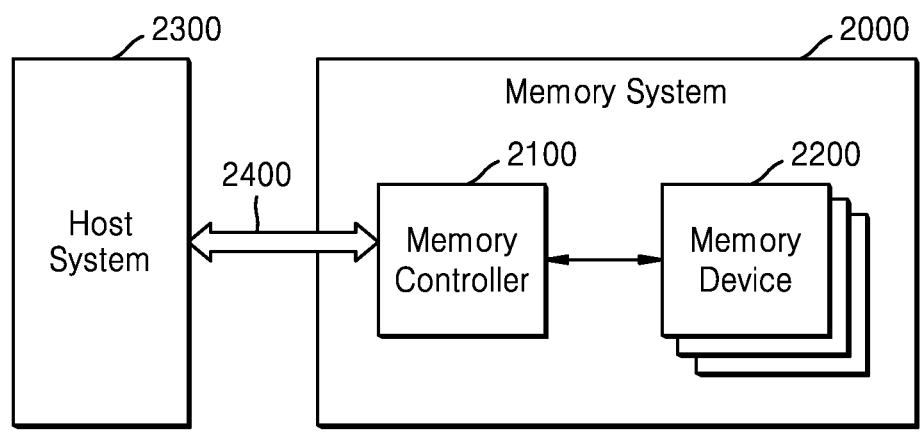
FIG. 12 is a block diagram showing systems according to an embodiment.

FIG. 12 is a block diagram showing systems including receivers, according to an embodiment. As shown in FIG. 12, a memory system 2000 and a host system 2300 may communicate with each other via an interface 2400, and the memory system 2000 may include a memory controller 2100 and memory devices 2200.

The interface 2400 may use electrical signals and/or optical signals and may include, as a non-limiting example, a serial advanced technology attachment (SATA) interface, a SATA express (SATAe) interface, a serial attached small computer system interface (SCSI) (SAS), a universal serial bus (USB) interface, or a combination thereof. The host system 2300 and the memory controller 2100 may include a serializer/deserializer (SerDes) for serial communication.

In some embodiments, the memory system 2000 may be removably coupled to the host system 2300 and communicate with the host system 2300. The memory devices 2200 may include volatile memory or non-volatile memory, and the memory system 2000 may be referred to as a storage system. For example, the memory system 2000 may include, as a non-limiting example, a solid-state drive or solid-state disk (SSD), an embedded SSD (eSSD), a multimedia card (MMC), an embedded multimedia card (eMMC), etc. The memory controller 2100 may control the memory devices 2200 in response to a request received from the host system 2300 via the interface 2400.

In addition, the receiver and/or the PAM-n decoder to which the embodiments are applied may be included in the memory controller 2100 and the memory devices 2200. For example, the memory controller 2100, the memory devices 2200, and the host system 2300 may receive input data based on PAM-4, decode an LSB, and output the LSB, through the methods according to the embodiments described above.

Figure 13:
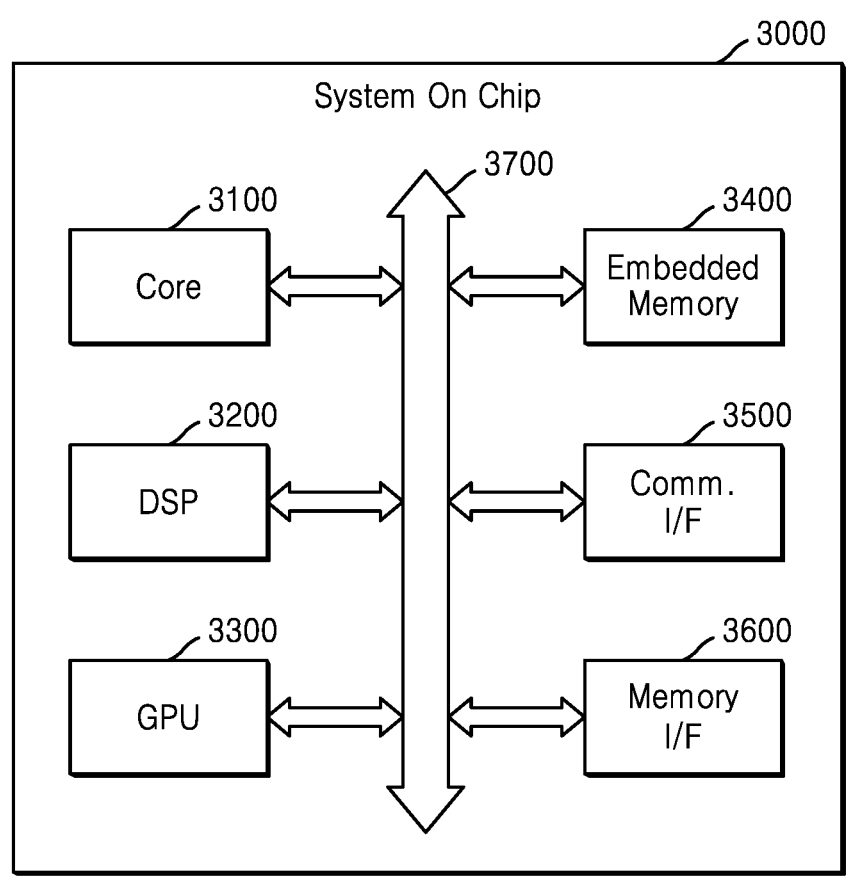
FIG. 13 is a block diagram showing a system-on-chip according to an embodiment.

FIG. 13 is a block diagram showing a system-on-chip (SoC) 3000 according to an embodiment. The SoC 3000 may refer to an integrated circuit in which components of a computing system or other electronic systems are integrated with each other. For example, an application processor (AP) as one example of the SoC 3000 may include a processor and components for other functions.

Referring to FIG. 13, the SoC 3000 may include a core 3100, a digital signal processor (DSP) 3200, a graphics processing unit (GPU) 3300, an embedded memory 3400, a communication interface 3500, and a memory interface 3600. Components of the SoC 3000 may communicate with each other via a bus 3700.

The core 3100 may process commands and control the operation of the components included in the SoC 3000. For example, the core 3100 may drive an operating system and run applications on the operating system by processing a series of commands. The DSP 3200 may generate useful data by processing digital signals, for example, digital signals provided from the communication interface 3500. The GPU 3300 may generate data for an image output through a display device, from image data provided from the embedded memory 3400 or the memory interface 3600, and the GPU 3300 may also encode the image data. The embedded memory 3400 may store data necessary for the core 3100, the DSP 3200, and the GPU 3300 to operate. The memory interface 3600 may provide an interface to external memory of the SoC 3000, such as DRAM and flash memory.

The communication interface 3500 may provide serial communication with the outside of the SoC 3000. For example, the communication interface 3500 may be connected to Ethernet and may include a SerDes for serial communication.

In addition, the communication interface 3500 of the PAM-n decoder, to which the above-described embodiments are applied, may be used in the memory interface 3600. For example, the communication interface 3500 or the memory interface 3600 may receive input data based on PAM-4 and decode an LSB through the methods according to the embodiments described above.

While the inventive concept has been particularly shown and described with reference to embodiments thereof, it will be understood that various changes in form and detail may be made thereto without departing from the spirit and scope of the inventive concept as set forth in the following claims.

What is claimed is:

1. A 4-level pulse amplitude modulation (PAM-4) decoder comprising:
    a comparator configured to receive first input data, second input data, and a clock signal and output first comparison data and second comparison data, wherein the first comparison data and the second comparison data are comparison results for the first input data and the second input data;
    a clock delay circuit configured to delay the clock signal and generate a delayed clock signal; and
    a time-windowed least significant bit (LSB) decoder configured to receive the first comparison data, the second comparison data, and the delayed clock signal,
    wherein the time-windowed LSB decoder is configured to perform a decoding when the delayed clock signal is at a first level.

2. The PAM-4 decoder of claim 1, wherein each of the first input data and the second input data comprises 2-bit data, and
    the first input data and the second input data comprise differential data.

3. The PAM-4 decoder of claim 1, wherein each of the first comparison data and the second comparison data comprises 1-bit data.

4. The PAM-4 decoder of claim 1, further comprising a latch electrically connected to the comparator and configured to sample the first comparison data and the second comparison data and output a most significant bit (MSB),
    wherein the time-windowed LSB decoder is configured to decode the first comparison data, the second comparison data, and the delayed clock signal and output an LSB.

5. The PAM-4 decoder of claim 1, wherein the time-windowed LSB decoder comprises:
    a clock OR gate configured to receive the first comparison data, the second comparison data, and the delayed clock signal and generate an output OR signal; and
    a flip-flop electrically connected to the clock OR gate, and configured to receive the output OR signal, and output an LSB.

6. The PAM-4 decoder of claim 5, wherein the time-windowed LSB decoder further comprises an inverter electrically connected between the clock OR gate and the flip-flop, the inverter configured to generate a flip-flop clock signal.

7. The PAM-4 decoder of claim 5, wherein the time-windowed LSB decoder is configured such that the output OR signal is generated when the delayed clock signal is at the first level and the first comparison data or second comparison data is at the first level.

8. The PAM-4 decoder of claim 5, wherein the clock OR gate comprises:
    a first transistor configured to receive the first comparison data;
    a second transistor configured to receive the second comparison data; and
    a third transistor configured to receive the delayed clock signal.

9. The PAM-4 decoder of claim 1, wherein the time-windowed LSB decoder is configured to perform the decoding based on the first comparison data and the second comparison data, in a time-window between a rising edge of the clock signal and a falling edge of the delayed clock signal.

10. The PAM-4 decoder of claim 1, wherein the clock delay circuit comprises an inverter and the inverter is configured to invert and delay the clock signal to generate the delayed clock signal.

11. A receiver comprising an n-level pulse amplitude modulation (PAM-n) decoder, wherein the PAM-n decoder comprises:
    a comparator receiving first input data, second input data, and a clock signal and outputting first comparison data and second comparison data, wherein the first comparison data and the second comparison data are comparison results for the first input data and the second input data;
    a clock delay circuit delaying the clock signal to generate a delayed clock signal; and
    a time-windowed least significant bit (LSB) decoder receiving the first comparison data, the second comparison data, and the delayed clock signal,
    wherein the time-windowed LSB decoder performs a decoding when the delayed clock signal is at a first level.

12. The receiver of claim 11, wherein the PAM-n decoder comprises a PAM-4 decoder,
    each of the first input data and the second input data comprises 2-bit data and each of the first comparison data and the second comparison data comprises 1-bit data, and
    the first input data and the second input data comprise differential data.

13. The receiver of claim 12, wherein the PAM-4 decoder further comprises a latch electrically connected to the comparator and sampling the first comparison data and the second comparison data to output a most significant bit (MSB),
    wherein the time-windowed LSB decoder decodes the first comparison data, the second comparison data, and the delayed clock signal and outputs an LSB.

14. The receiver of claim 11, wherein the time-windowed LSB decoder comprises:
    a clock OR gate receiving the first comparison data, the second comparison data, and the delayed clock signal and generating an output OR signal;
    a flip-flop electrically connected to the clock OR gate, receiving the output OR signal, and outputting an LSB; and
    an inverter electrically connected between the clock OR gate and the flip-flop and generating a flip-flop clock signal.

15. The receiver of claim 14, wherein the time-windowed LSB decoder is configured such that the output OR signal is generated when the delayed clock signal is at the first level and the first comparison data or second comparison data is at the first level.

16. The receiver of claim 15, wherein the time-windowed LSB decoder is configured to perform the decoding based on the first comparison data and the second comparison data, in a time-window between a rising edge of the clock signal and a falling edge of the delayed clock signal.

17. A memory device comprising an interface configured to receive input data based on n-level pulse amplitude modulation (PAM-n), wherein the interface comprises a PAM-n decoder, and
    the PAM-n decoder comprises:

a comparator that receives first input data, second input data, and a clock signal and outputs first comparison data and second comparison data, wherein the first comparison data and the second comparison data are comparison results for the first input data and the second input data;

a clock delay circuit that delays the clock signal to generate a delayed clock signal; and a time-windowed least significant bit (LSB) decoder that receives the first comparison data, the second comparison data, and the delayed clock signal, wherein the time-windowed LSB decoder performs a decoding when the delayed clock signal is at a first level.

18. The memory device of claim 17, wherein the time-windowed LSB decoder comprises:

a clock OR gate that receives the first comparison data, the second comparison data, and the delayed clock signal and generates an output OR signal;

a flip-flop electrically connected to the clock OR gate, wherein the flip-flop receives the output OR signal, and outputs an LSB; and an inverter electrically connected between the clock OR gate and the flip-flop, wherein the inverter generates a flip-flop clock signal.

19. The memory device of claim 17, wherein the PAM-n decoder comprises a PAM-4 decoder, each of the first input data and the second input data comprises 2-bit data and each of the first comparison data and the second comparison data comprises 1-bit data, and the first input data and the second input data comprise differential data.

20. The memory device of claim 18, wherein the time-windowed LSB decoder is configured such that the output OR signal is generated when the delayed clock signal is at the first level and the first comparison data or second comparison data is at the first level, and the time-windowed LSB decoder performs the decoding based on the first comparison data and the second comparison data, in a time-window between a rising edge of the clock signal and a falling edge of the delayed clock signal.

* * * * *